Nov. 26, 1929.   H. R. COLLINS   1,736,847
PULVERIZED FUEL FURNACE
Filed July 1, 1919   2 Sheets-Sheet 2
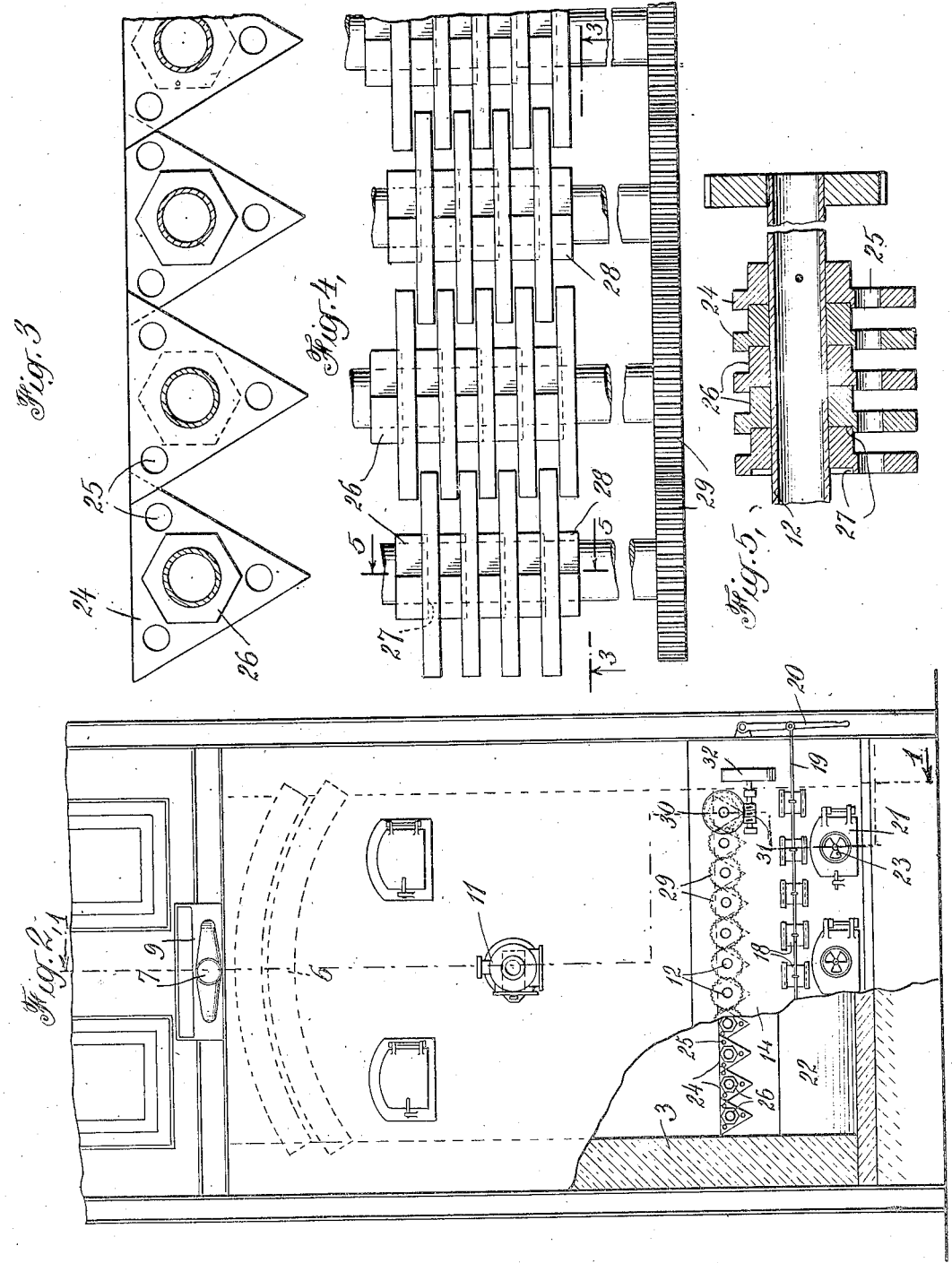
INVENTOR
H. R. Collins,
BY
Pennie, Davis, Marvin & Edmonds
ATTORNEY Patented Nov. 26, 1929

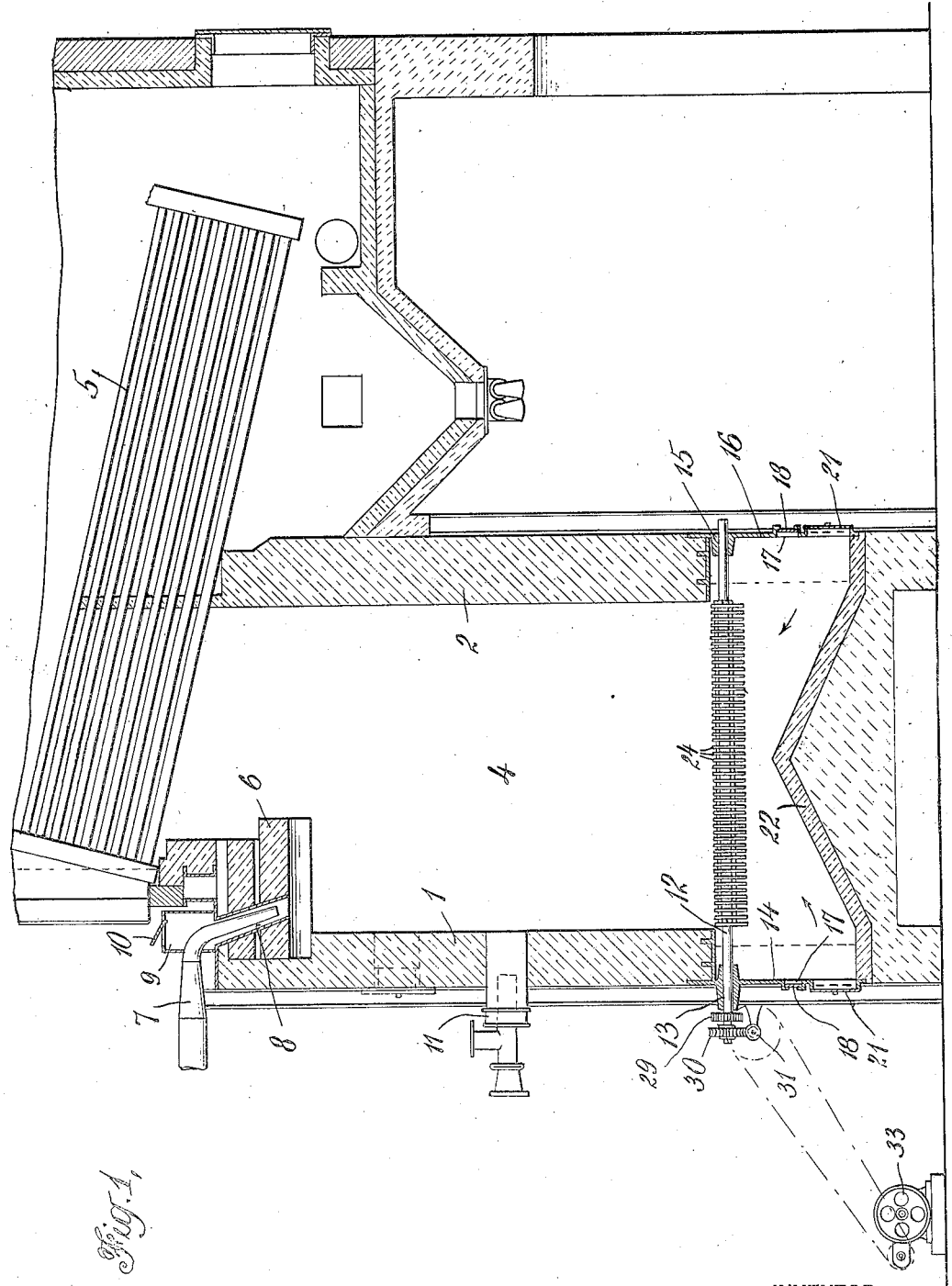

1,736,847

UNITED STATES PATENT OFFICE

HARRY RAYMOND COLLINS, OF ALLENTOWN, PENNSYLVANIA, ASSIGNOR, BY MESNE ASSIGNMENTS, TO FULLER LEHIGH COMPANY, A CORPORATION OF DELAWARE

PULVERIZED-FUEL FURNACE

Application filed July 1, 1919. Serial No. 307,880.

This invention relates to the use of pulverized fuel in furnaces and is directed to the provision of a furnace of improved construction and a novel method of operation whereby superior results are obtained.

The usual practice in the utilization of fuel in pulverized form is to introduce the fuel into the furnace in an air stream. In recent years the use of pulverized fuel in the furnaces of stationary boilers has demonstrated the great importance of maintaining the velocity of flow of the gases of combustion through the furnace very low, preferably under 10 feet per second. The employment of this low velocity insures complete consumption of the fuel particles before they enter the space about the boiler tubes and greatly reduces erosion of the walls of the furnace, thereby effecting a corresponding increase in the life of the furnace.

I have found that the proper introduction of pulverized coal in substantial quantity into the furnace of a stationary boiler does not require the admixture with the fuel of all of the air necessary for combustion of the fuel within the furnace. Free flow of the fuel into the furnace can be effected with much less air. This being so, the balance of the air required for combustion may be introduced otherwise than through the burner tube and may be utilized for effecting additional purposes. I introduce it into the furnace in opposition to the general direction of travel of the particles of pulverized fuel within the furnace so that this additional supply of air exerts a sustaining effect on the particles of fuel and thereby lengthens the period of travel through the furnace.

The method of operation which gives the best results is to introduce the pulverized fuel into the upper portion of the furnace in a wide thin stream and allow it to drop vertically by gravity, the volume and pressure of the air admitted with the fuel being just enough to cause movement of the fuel at the desired rate. Among users of pulverized fuel, this is termed "fogging" the fuel into the furnace. In combination with this, I provide an air inlet near the lower part of the furnace and introduce through it such additional air as is required for completing combustion of the fuel. This air rising from the inlet near the bottom of the furnace exerts a sustaining effect upon the particles of fuel dropped vertically through the furnace and insures that they will be held in suspension such a length of time as will be ample for complete consumption of the combustible constituents of the fuel particles. The upwardly moving current of air also tends to carry the non-combustible constituents of the finer fuel particles toward the upper regions of the furnace, from which they are carried into the stack with the gaseous products of combustion. The heavier non-combustible residues pass through the relatively cool incoming air as they approach the bottom of the furnace and are deposited in granular or sand-like condition.

It has been proposed heretofore to provide a pulverized fuel furnace with a traveling grate at the bottom thereof to carry off any deposit of the ash content of the fuel. The provision of such a traveling grate is very important for several reasons. When the ash of pulverized fuel is deposited on a relatively cool surface at the bottom of the furnace, it takes a granular form, that is, there is considerable adhesion of the ash particles. But, if the ash deposit is allowed to accumulate to a substantial depth, the bed of ash, or at least the portion thereof removed slightly from contact with the grate fuses into a solid mass under the influence of the high temperature existing in the furnace. The slag thus formed can be removed only with a considerable expenditure of time and labor. Furthermore, if an ash deposit is allowed to accumulate, it reduces the volume of the furnace with the result that the velocity of travel of the fuel and the gases of combustion through the furnace is correspondingly increased. Therefore, in the practice of my invention I employ a movable grate at the bottom of the furnace for receiving the ash deposit and discharging it in granular form into a pit from which it may be removed from time to time. The inlet for the supplemental air stream which sustains the fuel particles and cools the non-combustible residues is preferably placed below the grate so that the air passes upward through the grate to keep it cool and thereby assist in cooling the ash deposited upon it.

The particular nature of the invention will appear more clearly from a description of a preferred embodiment, and for this purpose the furnace is shown in combination with a water tube boiler of standard form. It will be understood, however, that the invention is not limited in its application to boilers, but may be used in pulverized fuel furnaces adapted for any other purpose. In the accompanying drawings, Fig. 1 is a longitudinal sectional view of the boiler taken along the line 1—1 of Fig. 2;

Fig. 2 is a view in elevation of the front end of the boiler with a section broken away;

Fig. 3 is an end view of some of the units of the mechanism for removing the residues of combustion;

Fig. 4 is a plan view of these units showing the section line upon which Fig. 3 is taken; and Fig. 5 is a longitudinal section of part of one of the units along the line 5—5 of Fig. 4.

Referring to the drawings in which similar reference characters denote similar parts throughout the several views, the boiler has a front wall 1, rear wall 2 and side walls 3, forming a combustion chamber 4 of relatively large volume and otherwise designed in accordance with the principles applicable to furnaces in which pulverized fuel is to be burned. The hot gases of combustion pass to the water tubes 5 through a passage at the top of the combustion chamber and then to the stack.

At the top of the combustion chamber is an arch 6, and extending through the arch is a nozzle 7, through which the pulverized fuel may be fed by any suitable mechanism, which, since it forms no part of this invention, is not shown. The fuel nozzle may be of any suitable form, but preferably is provided with a narrow elongated mouth, so that it projects the fuel into the combustion chamber in a thin cloud. Surrounding the nozzle 7 is a passageway 8, through which air may be supplied to mix with the fuel, this air entering a chamber 9, having ports controlled by dampers 10, so that the supply of air may be regulated. Instead of admitting the fuel-laden air through the top of the furnace, it may be supplied through the front or side walls of the furnace, as by means of a burner tube 11 of suitable construction.

The mechanism for removing the residues of combustion is mounted at the bottom of the combustion chamber and comprises a series of hollow shafts 12, mounted in suitable bearings 13 in a housing 14, forming the front wall of the ash pit part of the boiler. A similar bearing 15 is provided in a housing 16 that forms the rear wall of the ash pit. Both of the housings 14 and 16 are provided with a number of ports 17, having sliding dampers 18 connected to a rod 19, leading to an operating lever 20, whereby the extent of the opening of all of the apertures may be simultaneously controlled. The housings 14 and 16 are also provided with a number of doors 21, through which the residues of combustion may be removed after they have been discharged onto the inclined bottom 22 of the ash pit. Each of the doors 21 is provided with adjustable inlet ports 23 by which the supply of air to the combustion chamber may be further regulated.

Upon the shafts 12 are mounted a number of triangular castings 24, each having a central aperture to receive the shaft and a number of smaller apertures 25 to permit the air to circulate through the castings. Each of the castings is provided on one side with a boss 26, preferably of hexagonal form, and on the other side with a correspondingly shaped recess 27, so that when the several castings are assembled on a shaft they form a continuous grate extending across the combustion chamber. The front castings of alternate shafts are provided with bosses 28, but the castings of the other shafts are without any such bosses, so that when the castings are mounted upon the shafts, they will be staggered with relation to each other, as shown most clearly in Fig. 4. This arrangement permits the castings of each unit to move without interfering with those of the adjacent units. The castings thus form, in effect, fingers which will break up any small crusts of ash which may form as the residues are deposited on the castings. The front end of each shaft 12 is provided with a gear 29, and the gears mesh with each other throughout the width of the furnace. The shaft 12 at the end of the series is provided with a pinion 30 engaged by a worm 31 having a pulley 32 which may be driven by a motor 33, or in any other convenient manner.

In the operation of the boiler described above, pulverized fuel in any desired amount is fed through the nozzle 7 under the influence of air pressure just sufficient to blow the fuel into the combustion chamber without imparting to the products of combustion such a velocity as will cause erosion of the furnace walls. If the nozzle has a wide opening, the fuel will enter the furnace in the form of a thin jet, and an induced current of air will enter on each side of the nozzle and may be regulated by the dampers 10. The air will thus supply oxygen to both sides of the thin stream of coal-laden air, one film passing along the front of the brick work and between it and the coal-laden air, while the other film passes along the thin stream of coal-laden air on the inside of the fire box. This arrangement will permit the ignited stream of coal to fall downwardly into the combustion chamber, giving a longer passage of the flame and completing combustion before striking the cold surfaces of the boiler.

The draft through the stack of the furnace draws air into the ash pit through the ports 17 and 23, and the amount of air taken in through these ports can be adjusted to such a fine degree that an analysis of the stack gases can be made to give high percentages of carbon dioxide. As the air enters the ports in the ash pit, it is at the temperature of the atmosphere, and it will pass upwardly between and through the castings of the revolving grate and meet the descending column of burning fuel in the combustion chamber, holding the particles of fuel in suspension and supplying the oxygen required to complete combustion. The upwardly moving current of cooler air will also tend to carry the finer particles of residue towards the stack, and thus prevent the deposit of large quantities of ash in the ash pit. The air which enters the furnace at substantially the temperature of the atmosphere will also cool the castings of the revolving grate and prevent them from becoming fused under the influence of the high temperatures prevailing in the combustion chamber.

As the air passes upwardly through the units of the revolving grate, it encounters the heavier particles of residue which are falling toward the grate, and cools them, so that the ash deposited on the grate will remain in granular or sand-like form and not tend to slag under the influence of the high temperatures in the combustion chamber. The units of the revolving grate are also further cooled by air which may circulate through the hollow shafts. During the operation of the furnace, the shafts are continuously rotated, so that the residues deposited on the triangular castings will be discharged into the ash pit, from which they may be removed from time to time through the doors 21.

The removal of the ash in granular form from the heat zone of the combustion chamber is constant throughout the operation of the boiler, and as the ash is continually passing through a current of relatively cool air, entering the ash pit, the possibility of slag formation is effectually prevented and the furnace may be kept continually in operation, it not being necessary to shut it down for the purpose of removing the slag-like deposit, as is the case with furnaces of usual construction. On account of the continual removal of the residues of combustion, the initial volume of the combustion chamber will remain constant, and this is essential to the successful burning of pulverized fuel in suspension, as even a slight change in the volume of the combustion chamber lessens the efficiency of combustion and also requires a greater velocity of the products of combustion as they pass through the same, so that erosion and destruction of the walls of the chamber are more likely to occur.

While the invention has been shown and described in connection with a standard form of boiler, it will be understood that it is equally applicable to any kind of a furnace in which pulverized fuel is to be burned, and also that any other form of mechanism for removing the residues of combustion as fast as they are produced, may be employed in place of the one shown; although the construction of the latter possesses many advantages which render it particularly adapted for use in the present relationship. It will also be understood that the pulverized fuel may be fed into the combustion chamber in any other manner and at the sides or front of the same, instead of at the top as shown in the present embodiment.

I claim:

1. A steam boiler furnace comprising the combination of a combustion chamber, a burner for introducing fuel into the chamber for combustion in suspension therein, and a metallic surface in the chamber maintained cooler than the combustion space of said chamber and positioned to receive particles falling from said combustion space, this surface being out of the normal path of the flaming stream from the burner and directly exposed to the combustion zone except for residues from said zone deposited thereon in normal operation.

2. A steam boiler furnace comprising the combination of a combustion chamber, a burner for introducing fuel into the chamber for combustion in suspension therein, a metallic surface positioned to receive particles falling from the combustion space of said chamber, said surface being out of the normal path of the flaming stream from the burner and directly exposed to the combustion zone except for residues from said zone deposited thereon in normal operation, and means for causing a cooling medium to flow in contact with said surface to abstract heat therefrom.

3. A steam boiler furnace comprising the combination of a combustion chamber, a burner for introducing fuel into the chamber for combustion in suspension therein, a metallic surface positioned to receive particles falling from the combustion space of said chamber, said surface being out of the normal path of the flaming stream from the burner and directly exposed to the combustion zone except for residues from said zone deposited thereon in normal operation, and means for causing a cooling medium to flow beneath said surface in contact therewith to abstract heat therefrom.

4. A steam boiler furnace comprising the combination of a combustion chamber, a burner for introducing fuel into the chamber for combustion in suspension therein, and a metallic surface cooler than the combustion space of said chamber positioned to receive particles falling from said combustion space, this surface including a plurality of spaced members extending across the chamber and being disposed out of the normal path of the flaming stream from the burner and directly exposed to the combustion zone except for residues from said zone deposited thereon in normal operation.

5. A steam boiler furnace comprising the combination of a combustion chamber, a burner for introducing fuel into the chamber for combustion in suspension therein, and a metallic surface cooler than the combustion space of said chamber and positioned to receive particles falling from said combustion space, this surface lying out of the normal path of the flaming stream from the burner and directly exposed to the combustion zone except for residues from said zone deposited thereon in normal operation, the said surface including a plurality of spaced metal members extending across the chamber and through the walls thereof and metal elements supported by said members.

6. A steam boiler furnace comprising the combination of a combustion chamber, a burner for introducing fuel into the chamber for combustion in suspension therein, a metallic surface positioned to receive particles falling from the combustion space of said chamber and disposed out of the normal path of the flaming stream from the burner and directly exposed to the combustion zone except for residues from said zone deposited thereon in normal operation, said surface including a plurality of spaced metallic members extending across the chamber and metallic elements mounted on said members and extending between them, and means for causing a cooling medium to flow in contact with said surface to abstract heat therefrom.

7. A steam boiler furnace comprising the combination of a combustion chamber, a burner for introducing pulverized fuel into the chamber in a substantially vertically downward direction for combustion in suspension in the combustion space of said chamber, an outlet near the top of the chamber, the flaming fuel passing through the chamber in a reverting path flowing downwardly from the burner and upwardly to the outlet, a metallic surface in the chamber positioned below the bend in the flaming stream and out of the normal path thereof and directly exposed to the combustion zone except for residues of combustion deposited thereon from said zone in normal operation, said surface serving to receive particles falling from the combustion space, and means for causing the flow of a cooling medium in contact with said surface to abstract heat therefrom.

8. A method of burning fuel in a combustion chamber which comprises continuously introducing, igniting, and maintaining the combustion of fuel in pulverulent form in suspension in said combustion chamber, receiving refuse particles precipitating from the combustion zone on a metallic surface in said combustion chamber, and abstracting heat from said surface by causing a cooling medium to flow in contact with said surface throughout normal operation to prevent substantial fusion of particles deposited on said surface from said combustion zone.

9. A method of burning pulverulent fuel in a combustion chamber which comprises continuously introducing pulverulent fuel in a substantially vertical downward direction into said chamber at a point near the top thereof, igniting and maintaining combustion of said fuel in said chamber, withdrawing the products of combustion through an outlet near the top of the chamber whereby the flaming stream flows from the point of introduction to the outlet along a substantially U-shaped path, receiving particles falling from the combustion space of said chamber on a metallic surface below the point at which the stream turns upon itself, and abstracting heat from the said receiving surface by causing a cooling medium to flow in contact with said surface continuously, said heat abstraction being carried on to the extent sufficient to prevent substantial fusion of particles deposited on said surface from the combustion zone.

10. A steam boiler furnace comprising the combination of a combustion chamber, a burner for introducing fuel into the chamber for combustion in suspension in a zone above the bottom thereof, a plurality of spaced members in the chamber below the combustion zone and in the path of particles precipitating from said zone in normal operation, said members being disposed out of the normal path of the flaming stream from the burner and directly exposed to the combustion zone except for residues from said zone deposited thereon in normal operation, means for subjecting said members to the action of a cooling medium to maintain them at a temperature cooler than that of the combustion zone, and an ash-receiving surface disposed beneath said members and spaced therefrom for receiving particles passing said members.

11. A steam boiler furnace comprising the combination of a combustion chamber, a burner for introducing fuel into the chamber in a substantially vertical downward direction for combustion in suspension in a zone above the bottom of the chamber, an outlet from the chamber near the top thereof whereby the flaming stream from the burner flows back upon itself in its passage to the outlet and has a substantial U-shape, and a plurality of spaced members below the combustion zone in the path of particles precipitating from said zone in normal operation and extending across the chamber, said members being out of the normal path of the flaming stream from the burner and directly exposed to the combustion zone except for residues from said zone deposited thereon in normal operation, means for subjecting said members to the action of a cooling medium to maintain them at a temperature cooler than that of the combustion space, and an ash-receiving surface disposed beneath said members and spaced therefrom to receive particles passing said spaced members.

12. A steam boiler furnace comprising the combination of a combustion chamber, a burner for introducing fuel into the chamber for combustion in suspension in a zone above the bottom thereof, a plurality of spaced metallic members in the chamber below the combustion zone in the path of particles precipitating from said zone in normal operation, said members lying out of the normal path of the flaming stream of the burner and directly exposed to the combustion zone except for residues deposited thereon in normal operation, means for causing a cooling medium to flow in contact with said members to maintain them at a temperature cooler than that of the combustion zone, and an ash-receiving surface disposed beneath said members and at a distance therefrom to receive particles passing said members.

13. The method of burning fuel in a combustion chamber which comprises continuously introducing, igniting, and maintaining the combustion of fuel in pulverulent form in suspension in a zone in the combustion chamber, receiving refuse particles precipitating from the zone in normal operation on a metallic surface disposed at a distance above an ash-receiving surface in said chamber and out of the normal path of the flaming fuel and directly exposed to the combustion zone except for residues from said zone deposited thereon in normal operation, and subjecting the particles during and subsequent to their lodgment on said metallic surface to the action of a cooling medium serving to lower the temperature of said particles below that of substantial coalescence.

In testimony whereof I affix my signature.

HARRY RAYMOND COLLINS.